(12) United States Patent
Chen et al.

(10) Patent No.: US 8,989,208 B2
(45) Date of Patent: Mar. 24, 2015

(54) PDCCH SEARCH SPACE DESIGN FOR LTE-A MULTI-CARRIER OPERATION

(75) Inventors: Wanshi Chen, San Diego, CA (US);
Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 595 days.

(21) Appl. No.: 12/770,506

(22) Filed: Apr. 29, 2010

(65) Prior Publication Data

US 2011/0110316 A1  May 12, 2011

Related U.S. Application Data

(60) Provisional application No. 61/174,441, filed on Apr. 30, 2009.

(51) Int. Cl.
*H04L 12/413* (2006.01)
*H04W 72/04* (2009.01)

(52) U.S. Cl.
CPC ............ *H04W 72/042* (2013.01); *H04W 72/04* (2013.01)
USPC .............................. 370/445; 370/329; 370/431

(58) Field of Classification Search
CPC ... H04W 24/00; H04W 48/12; H04W 72/042; H04W 72/005
See application file for complete search history.

(56) References Cited

U.S. PATENT DOCUMENTS

| | | | |
|---|---|---|---|
| 2009/0088148 A1 | 4/2009 | Chung et al. | |
| 2010/0254268 A1* | 10/2010 | Kim et al. | 370/241 |
| 2010/0303011 A1* | 12/2010 | Pan et al. | 370/328 |
| 2011/0110315 A1* | 5/2011 | Chen et al. | 370/329 |
| 2011/0243090 A1* | 10/2011 | Grovlen et al. | 370/329 |

FOREIGN PATENT DOCUMENTS

| | | |
|---|---|---|
| CN | 1719942 A | 1/2006 |
| CN | 101001138 A | 7/2007 |
| CN | 101132229 A | 2/2008 |
| CN | 101404526 A | 4/2009 |
| WO | 2009037854 A1 | 3/2009 |
| WO | 2009041779 A1 | 4/2009 |
| WO | 2010087177 A1 | 8/2010 |

OTHER PUBLICATIONS

International Search Report and Written Opinion—PCT/US2010/033260—International Search Authority, European Patent Office,Jan. 5, 2011.

(Continued)

*Primary Examiner* — Andrew Chriss
*Assistant Examiner* — Salvador E Rivas
(74) *Attorney, Agent, or Firm* — Paul Kuo

(57) ABSTRACT

A method, an apparatus, and a computer program product are provided in which a configuration for utilizing a plurality of carriers is received. In addition, a set of PDCCH candidates on a carrier of the plurality of carriers are determined for obtaining DCI for at least one carrier of the plurality of carriers. The number of PDCCH candidates is a function of a number of carriers of the at least one carrier.

44 Claims, 18 Drawing Sheets

(56) References Cited

OTHER PUBLICATIONS

Motorola: "Search Space Definition: Reduced PDCCH Blind Detection for Split PDCCH Search Space", 3GPP Draft; R1-080079—Split Search Space for Reduced PDCCH Blind Detection, 3rd Generation Partnership Project (3GPP), Mobile Competence Centre ; 650, Route Des Lucioles ; F-06921 Sophia-Antipolis Cedex ; France, vol. RAN WG1, no. Sevilla , Spain; Jan. 9, 2008, XP050108617, [retrieved on Jan. 9, 2008].

PDCCH blind decoding—Outcome of offline discussions, R1-081101, Internet Citation, Feb. 11, 2008, pp. 1-7, XP002534832, Retrieved from the Internet: URL:http://ftp.3gpp.org/tsg_ran/WG1_RL1/TS GR1_52/Docs/?C=N [retrieved on Jul. 2, 2009].

CMCC: "Resource Allocation and PDCCH Design Issues in Carrier Aggregation", 3GPP TSG-RAN WG1 #55bis R1-090337, Jan. 12, 2009.

Huawei: "PDCCH design for carrier aggregation", 3GPP TSG RAN WG1#55bis R1-090127, Jan. 12, 2009.

Nokia et al., "L1 control signaling with carrier aggregation in LTE-Advanced", 3GPP Draft; R1-083730, 3rd Generation Partnership Project (3GPP), Mobile Competence Centre ; 650, Route Des Lucioles ; F-06921 Sophia-Antipolis Cedex ; France, no. Prague, Czech Republic; Sep. 24, 2008, XP050317069, [retrieved on Sep. 24, 2008].

Taiwan Search Report—TW099113991—TIPO—Mar. 18, 2013.

* cited by examiner

| Type | Search Space Aggregation Level | Size in CCEs | Number of PDCCH Candidates |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

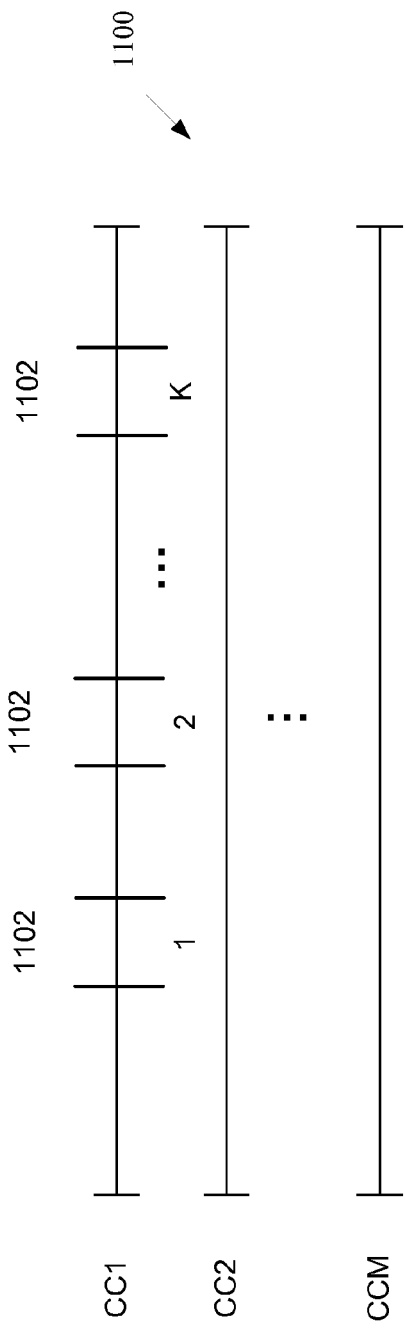
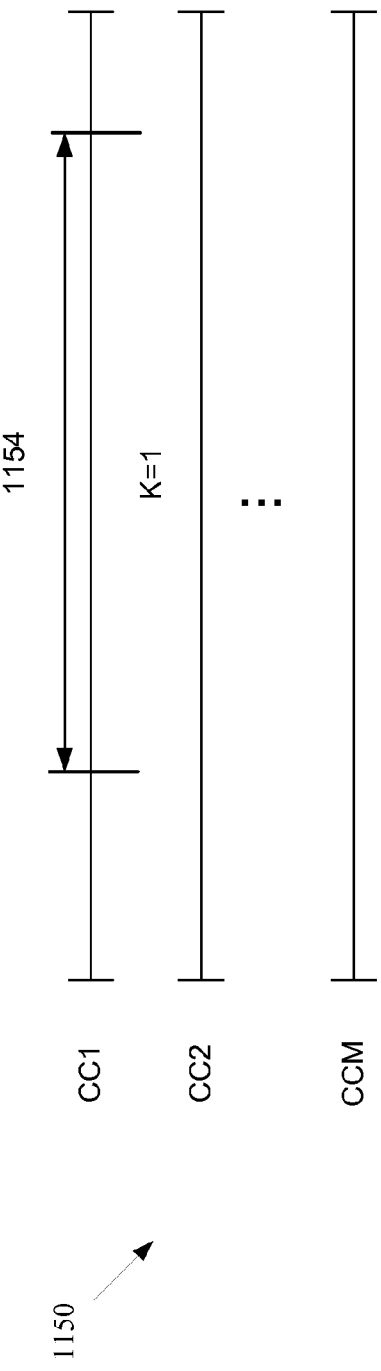
FIG. 11A
FIG. 11B

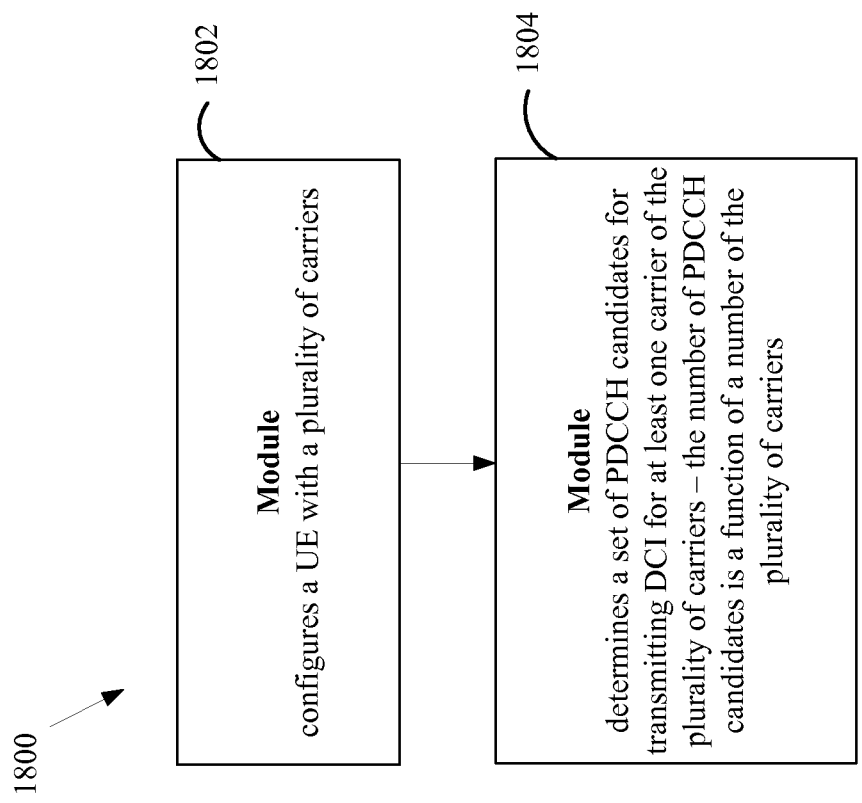

PDCCH SEARCH SPACE DESIGN FOR LTE-A MULTI-CARRIER OPERATION

CROSS-REFERENCE TO RELATED APPLICATIONS

Pursuant to 35 U.S.C. §119(e), this application claims the benefit of U.S. Provisional Patent Application No. 61/174,441, entitled "PDCCH Search Space Design for LTE-A Cross-Carrier Control Signaling," filed on Apr. 30, 2009, which is expressly incorporated by reference herein in its entirety.

BACKGROUND

1. Field

The present disclosure relates generally to communication systems, and more particularly, to physical downlink control channel (PDCCH) search space design for Long Term Evolution (LTE) Advanced (LTE-A) multi-carrier operation.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

In LTE-A, each UE may be configured via radio resource control (RRC) signaling to be served by multiple component carriers (CCs). The design of the control for multi-carrier operation is important with respect to overhead, efficiency, reliability, robustness, and complexity.

SUMMARY

In an aspect of the disclosure, a method, an apparatus, and a computer program product are provided in which a configuration for utilizing a plurality of carriers is received. In addition, a set of physical downlink control channel (PDCCH) candidates on a carrier of the plurality of carriers are determined for obtaining downlink control information (DCI) for at least one carrier of the plurality of carriers. The number of PDCCH candidates is a function of a number of carriers of the at least one carrier.

In an aspect of the disclosure, a method, an apparatus, and a computer program product are provided in which a user equipment is configured with a plurality of carriers. In addition, a set of PDCCH candidates is determined for transmitting DCI for at least one carrier of the plurality of carriers. The number of PDCCH candidates is a function of a number of the plurality of carriers.

BRIEF DESCRIPTION OF THE DRAWINGS

FIG. 11A is a diagram for illustrating an increase in a total number of decoding candidates through an increase in a number of search spaces.

FIG. 11B is a diagram for illustrating an increase in a total number of decoding candidates through an increase in a number of decoding candidates for one search space.

FIG. 18 is another conceptual block diagram illustrating the functionality of an exemplary apparatus.

DETAILED DESCRIPTION

Figure 1:
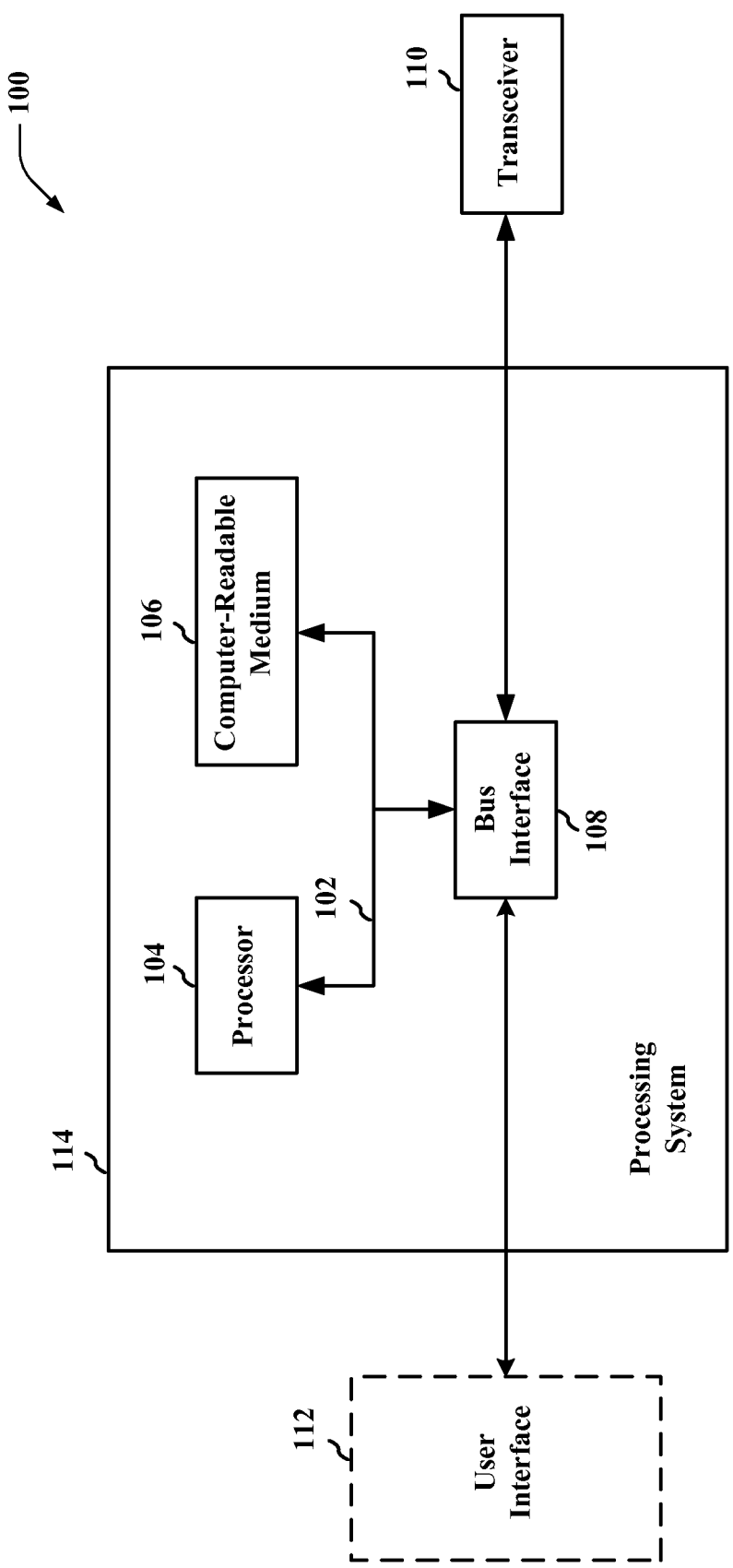
FIG. 1 is a conceptual diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
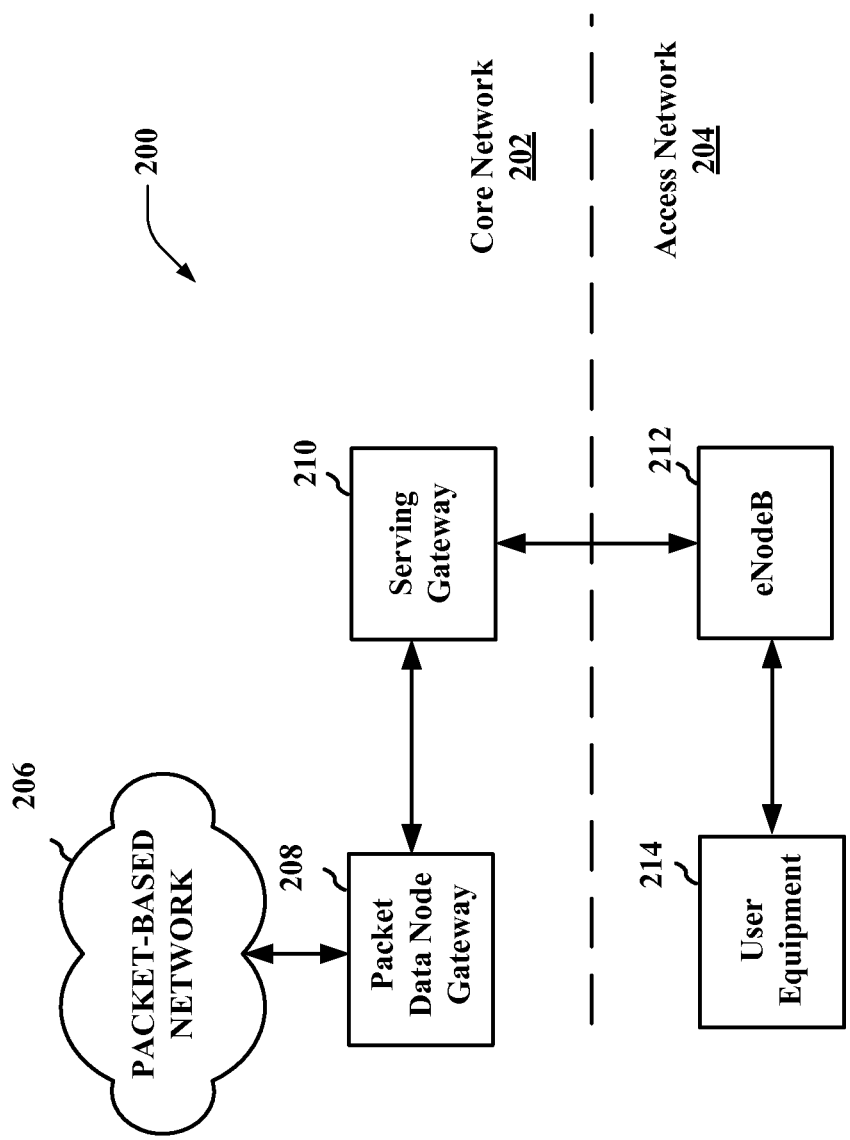
FIG. 2 is a conceptual diagram illustrating an example of a network architecture.

An example of a telecommunications system employing various apparatus will now be presented with reference to an LTE network architecture as shown in FIG. 2. The LTE network architecture 200 is shown with a core network 202 and an access network 204. In this example, the core network 202 provides packet-switched services to the access network 204, however, as those skilled in the art will readily appreciate, the various concepts presented throughout this disclosure may be extended to core networks providing circuit-switched services.

The access network 204 is shown with a single apparatus 212, which is commonly referred to as an evolved NodeB in LTE applications, but may also be referred to by those skilled in the art as a base station, a base transceiver station, a radio base station, a radio transceiver, a transceiver function, a basic service set (BSS), an extended service set (ESS), or some other suitable terminology. The eNodeB 212 provides an access point to the core network 202 for a mobile apparatus 214. Examples of a mobile apparatus include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The mobile apparatus 214 is commonly referred to as user equipment (UE) in LTE applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The core network 202 is shown with several apparatus including a packet data node (PDN) gateway 208 and a serving gateway 210. The PDN gateway 208 provides a connection for the access network 204 to a packet-based network 206. In this example, the packet-based network 206 is the Internet, but the concepts presented throughout this disclosure are not limited to Internet applications. The primary function of the PDN gateway 208 is to provide the UE 214 with network connectivity. Data packets are transferred between the PDN gateway 208 and the UE 214 through the serving gateway 210, which serves as the local mobility anchor as the UE 214 roams through the access network 204.

Figure 3:
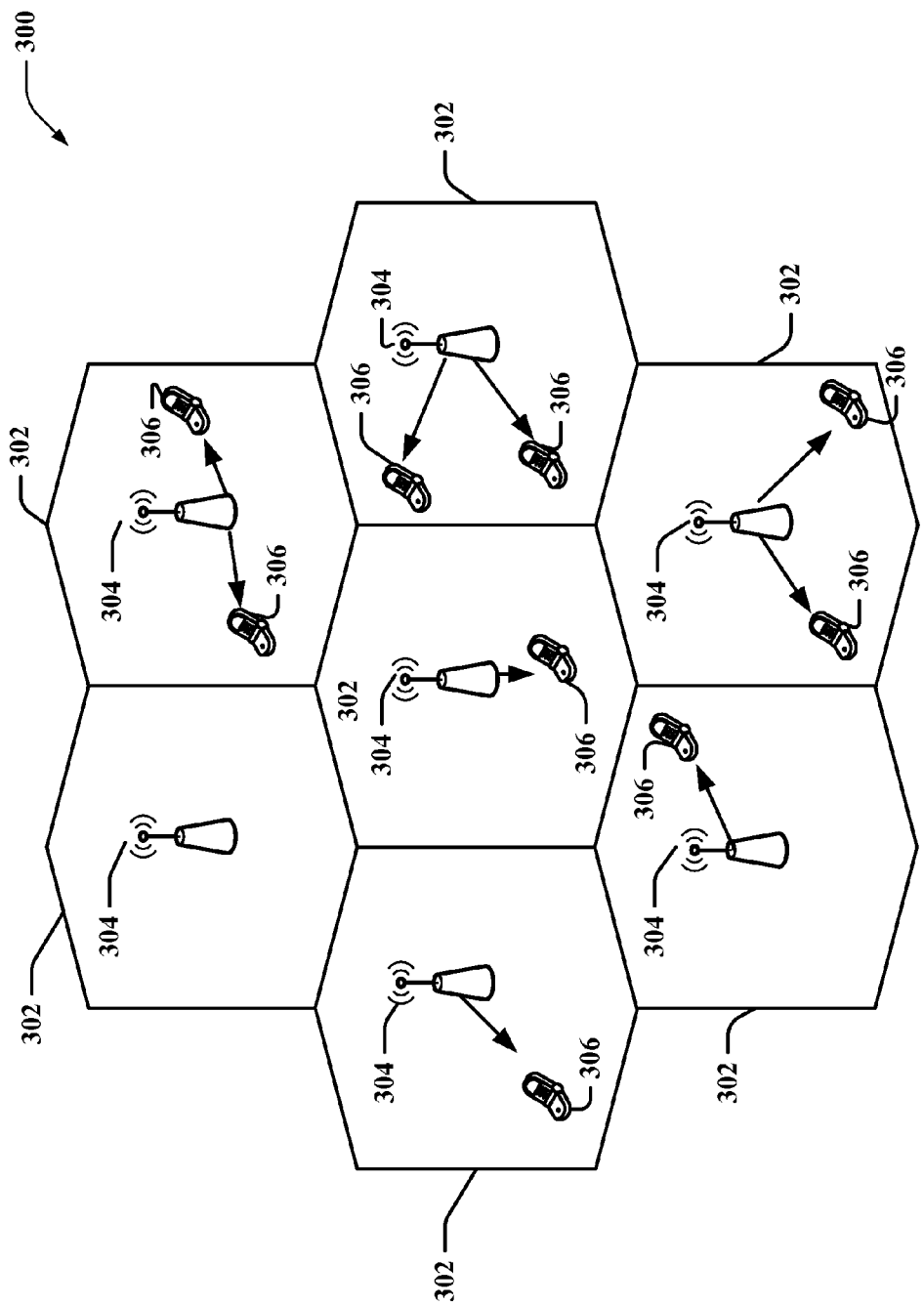
FIG. 3 is a conceptual diagram illustrating an example of an access network.

An example of an access network in an LTE network architecture will now be presented with reference to FIG. 3. In this example, the access network 300 is divided into a number of cellular regions (cells) 302. An eNodeB 304 is assigned to a cell 302 and is configured to provide an access point to a core network 202 (see FIG. 2) for all the UEs 306 in the cell 302. There is no centralized controller in this example of an access network 300, but a centralized controller may be used in alternative configurations. The eNodeB 304 is responsible for all radio related functions including radio bearer control, admission control, mobility control, scheduling, security, and connectivity to the serving gateway 210 in the core network 202 (see FIG. 2).

The modulation and multiple access scheme employed by the access network 300 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeB 304 may have multiple antennas supporting MIMO technology. The use of MIMO technology enables the eNodeB 304 to exploit the spatial domain to support spatial multiplexing, beamforming, and transmit diversity.

Spatial multiplexing may be used to transmit different streams of data simultaneously on the same frequency. The data steams may be transmitted to a single UE 306 to increase the data rate or to multiple UEs 306 to increase the overall system capacity. This is achieved by spatially precoding each data stream and then transmitting each spatially precoded stream through a different transmit antenna on the downlink. The spatially precoded data streams arrive at the UE(s) 306 with different spatial signatures, which enables each of the UE(s) 306 to recover the one or more data streams destined for that UE 306. On the uplink, each UE 306 transmits a spatially precoded data stream, which enables the eNodeB 304 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PARR).

Figure 4:
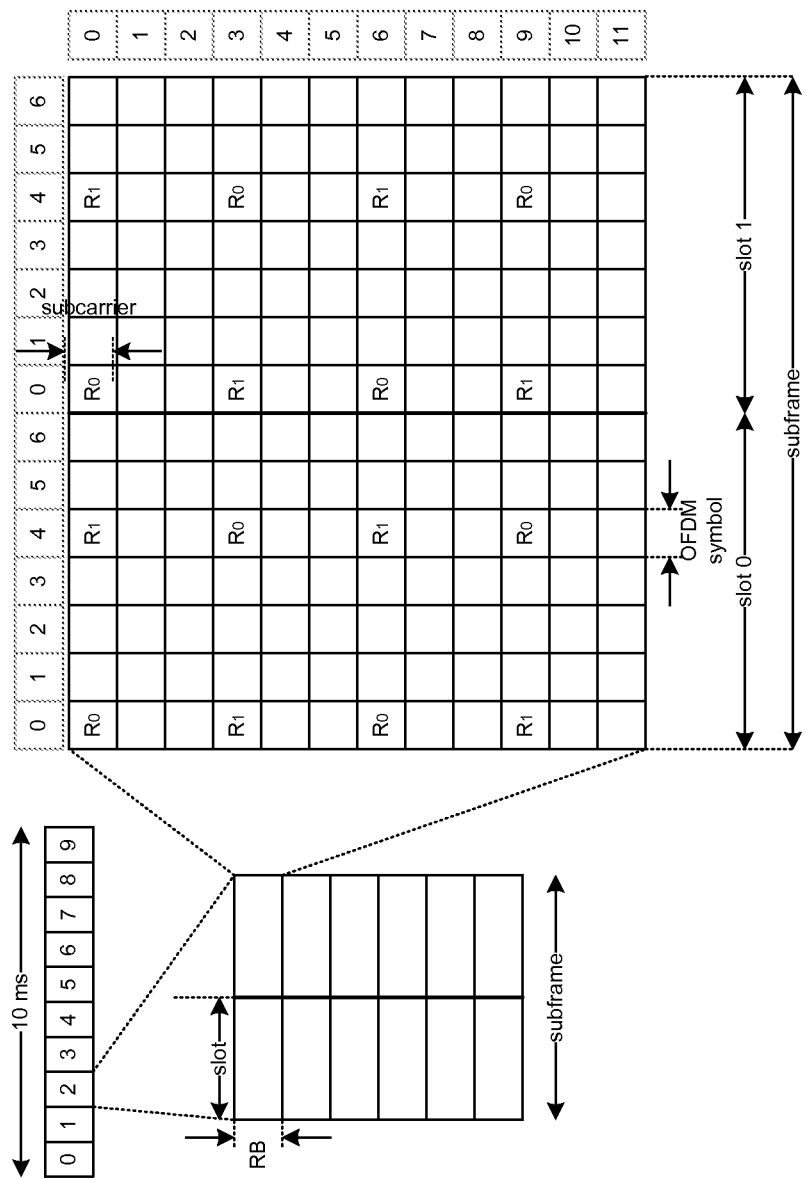
FIG. 4 is a conceptual diagram illustrating an example of a frame structure for use in an access network.

Various frame structures may be used to support the DL and UL transmissions. An example of a DL frame structure will now be presented with reference to FIG. 4. However, as those skilled in the art will readily appreciate, the frame structure for any particular application may be different depending on any number of factors. In this example, a frame (10 ms) is divided into 10 equally sized sub-frames. Each sub-frame includes two consecutive time slots.

A resource grid may be used to represent two time slots, each two time slots including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. Some of the resource elements, as indicated as $R_0$ and $R_1$, include a DL reference signal (DL-RS). The DL-RS include Cell-specific RS (CRS) (also sometimes called common RS) and UE-specific RS (UE-RS). UE-RS are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 5:
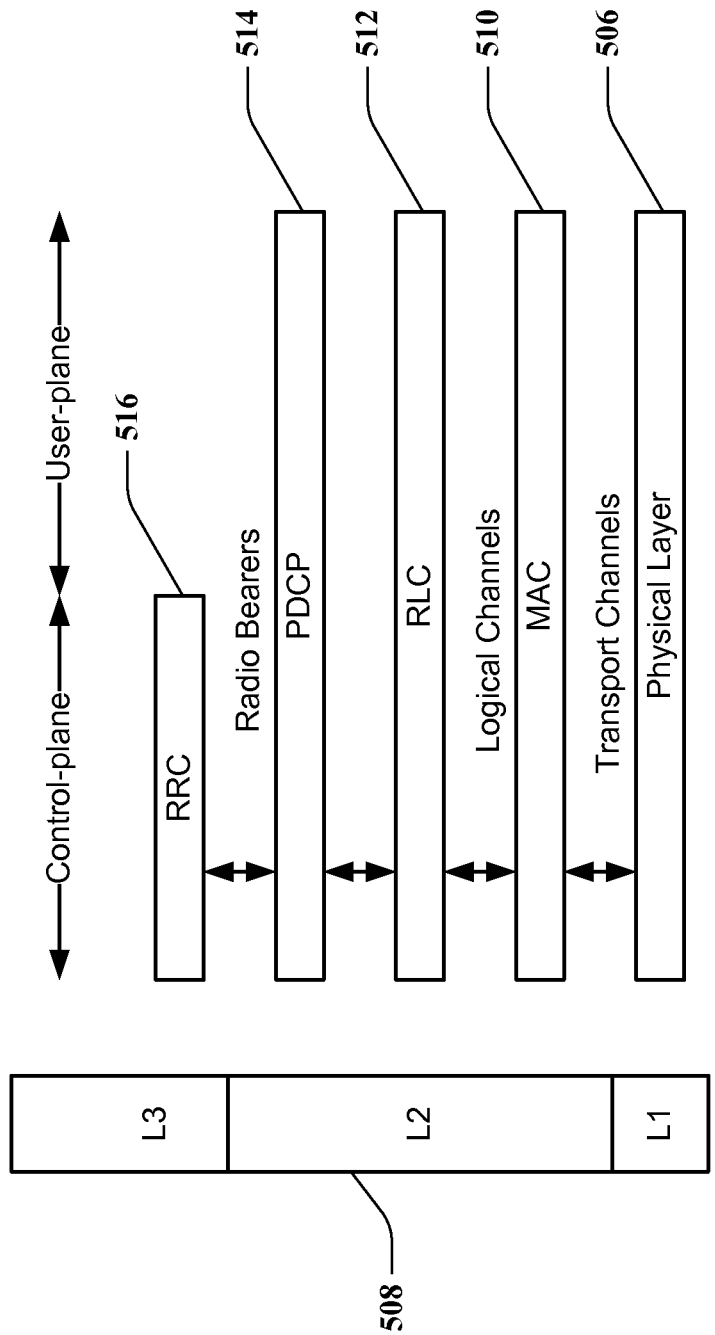
FIG. 5 is a conceptual diagram illustrating an example of a radio protocol architecture for the user and control plane.

The radio protocol architecture may take on various forms depending on the particular application. An example for an LTE system will now be presented with reference to FIG. 5. FIG. 5 is a conceptual diagram illustrating an example of the radio protocol architecture for the user and control planes.

Turning to FIG. 5, the radio protocol architecture for the UE and eNodeB is shown with three layers: Layer 1, Layer 2, and Layer 3. Layer 1 is the lowest lower and implements various physical layer signal processing functions. Layer 1 will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 208 (see FIG. 2) on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control pane, the radio protocol architecture for the UE and eNodeB is substantially the same for the physical layer 506 and the L2 layer 508 with the exception that there is no header compression function for the control plane. The control pane also includes a radio resource control (RRC) sublayer 516 in Layer 3. The RRC sublayer 516 is responsible for obtaining radio resources (i.e., radio bearers) and for configuring the lower layers using RRC signaling between the eNodeB and the UE.

Figure 6:
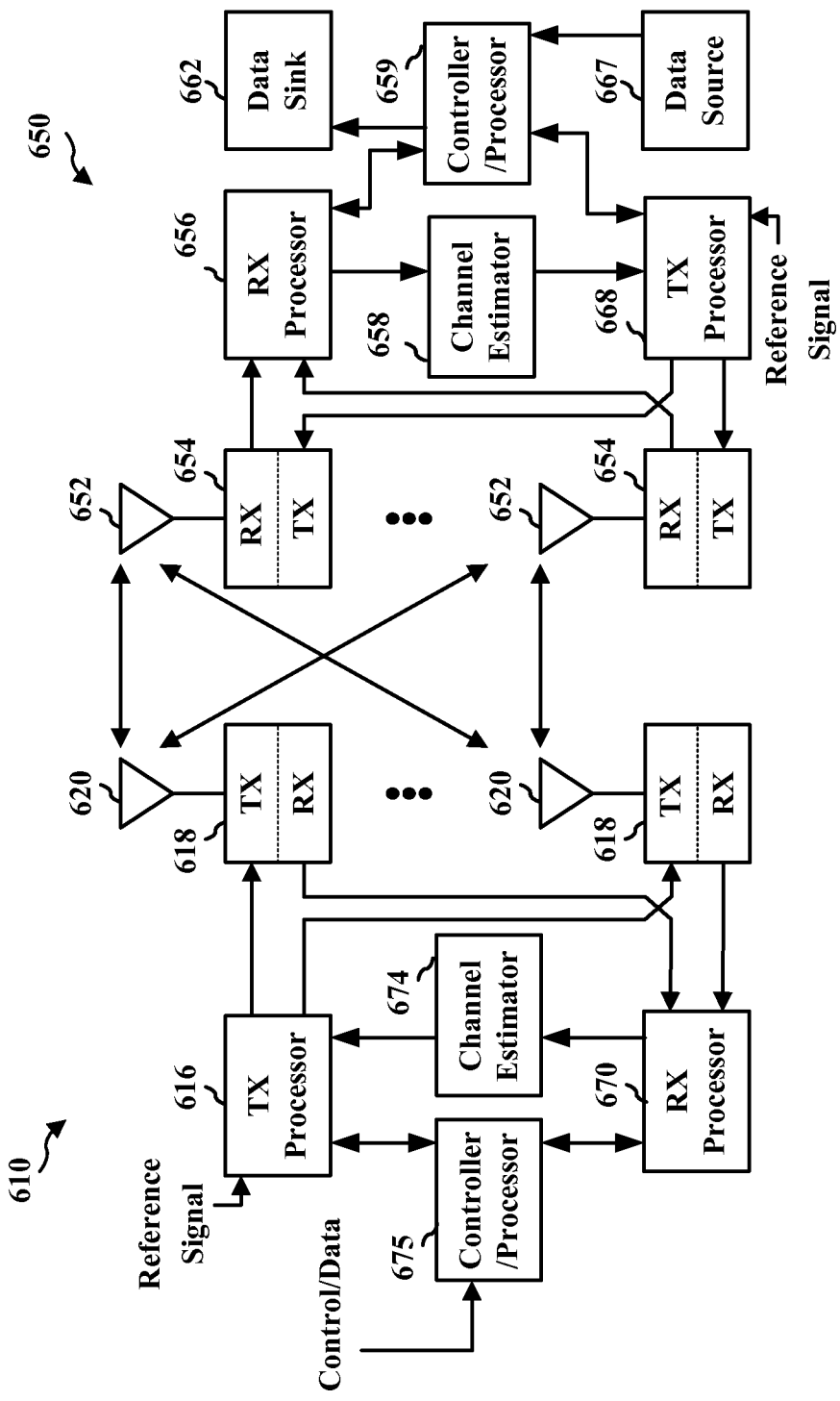
FIG. 6 is a conceptual diagram illustrating an example of an eNodeB and UE in an access network.

FIG. 6 is a block diagram of an eNodeB 610 in communication with a UE 650 in an access network. In the DL, upper layer packets from the core network are provided to a controller/processor 675. The controller/processor 675 implements the functionality of the L2 layer described earlier in connection with FIG. 5. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656.

The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

The controller/processor 659 implements the L2 layer described earlier in connection with FIG. 5. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer (L2). Similar to the functionality described in connection with the DL transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 implements the L1 layer.

The controller/processor 659 implements the L2 layer described earlier in connection with FIG. 5. In the UL, the control/processor 659 provides demultiplexing between transport and logical channels, packet reassembly, deciphering, header decompression, control signal processing to recover upper layer packets from the UE 650. Upper layer packets from the controller/processor 675 may be provided to the core network. The controller/processor 659 is also responsible for error detection using an ACK and/or NACK protocol to support HARQ operations.

The processing system 100 described in relation to FIG. 1 includes the eNodeB 610. In particular, the processing system 100 includes the TX processor 616, the RX processor 670, and the controller/processor 675. The processing system 100 described in relation to FIG. 1 includes the UE 650. In particular, the processing system 100 includes the TX processor 668, the RX processor 656, and the controller/processor 659.

Figure 7:
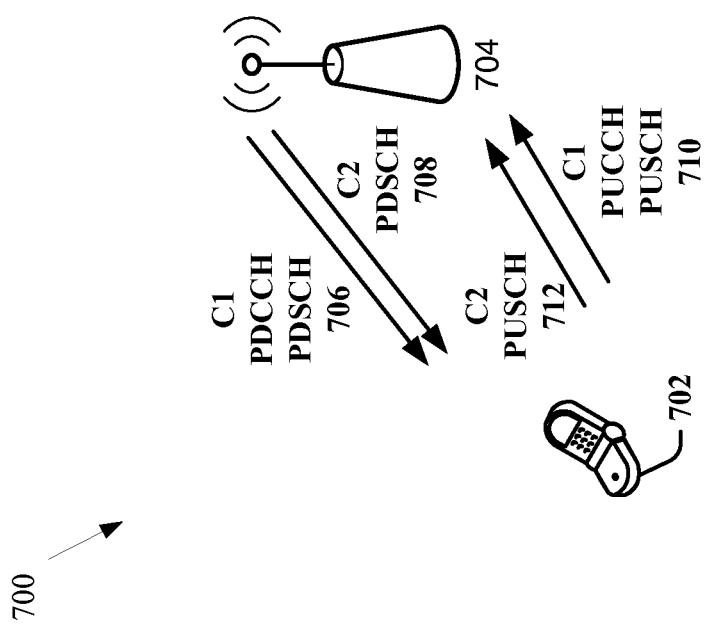
FIG. 7 is a diagram illustrating a UE receiving multiple carriers.

FIG. 7 is a diagram 700 illustrating a UE 702 receiving multiple carriers. As shown in FIG. 7, the UE 702 receives carriers C1 706 and C2 708 from the eNodeB 704. The eNodeB 704 transmits PDCCH and PDSCH on carrier C1 706 and PDSCH on carrier C2 708. In LTE-A with multi-carrier operations, the PDCCH on carrier C1 706 may carry control information (e.g., assignments) for carrier C2 708. That is, PDCCH may be sent from one component carrier C1 706, which may be a primary component carrier (or anchor carrier), and carry assignments for both carrier C1 706 and carrier C2 708. Furthermore, as shown in FIG. 7, the UE 702 transmits PUCCH and PUSCH on carrier C1 710 and PUSCH on carrier C2 712. The carrier C1 710 carries control information for carrier C2 712. While FIG. 7 shows cross-carrier signaling for both UL and DL, cross-carrier signaling may be on DL with single-carrier signaling on UL, or cross-carrier signaling may be on UL with single-carrier signaling on DL. Furthermore, while the number of component carriers is shown to be two for UL and DL, the number of component carriers may differ between UL and DL.

The differentiation of PDCCH intended for different component carriers may be embedded in the control signaling information fields or via different cyclic redundancy check (CRC) scrambling (e.g., via different radio network temporary identifiers (RNTIs) for different component carriers). A design of the PDCCH search space for LTE-A multi-carrier operation is discussed infra. The control signaling may include same-carrier control signaling, where PDCCH and PDSCH are located on the same component carrier, and cross-carrier control signaling, where PDCCH and PDSCH are located on different component carriers. For a given UE, the PDCCH control signaling may be expected to be received from one or more component carriers.

Figure 8:
FIG. 8 is a table showing the number of PDCCH candidates for UE-specific and common search spaces based on the aggregation level.

FIG. 8 is a table showing the number of PDCCH candidates for UE-specific and common search spaces based on the aggregation level. In LTE Release 8 (Rel-8), each UE is required to monitor both the common search space and a UE-specific search space. The max number of PDCCH candidates that a UE has to attempt to decode in a subframe is 6 in the common search space (4 for control channel element (CCE) aggregation level 4 and 2 for CCE aggregation level 8) and 16 in the UE-specific search space (6, 6, 2, and 2 for CCE aggregation levels 1, 2, 4, and 8, respectively).

Each UE is configured via RRC signaling to operate with one of seven transmission modes. Under each transmission mode, each UE is required to monitor two different PDCCH sizes. As a result, the number of hypotheses detections is: (6+16)*2=44. That is, each UE is required to perform up to 44 blind decodes and therefore to look for each of the 22 decoding candidates and to try to decode each of the decoding candidates using each of the two downlink control information (DCI) sizes.

Each UE may be assigned two or more RNTIs (e.g., cell RNTI (C-RNTI) and semi-persistent scheduling (SPS) C-RNTI). The determination of the UE-specific search space is based on one RNTI (e.g., C-RNTI) only, and the search space may vary from subframe to subframe. To be more specific, the CCEs corresponding to PDCCH candidate m of the UE-specific search space with aggregation level L are given by $$L \cdot \{(Y_k + m) \bmod \lfloor N_{CCE,k}/L \rfloor\} + i \quad \text{(Eq. 1)}$$

where $i=0, \ldots, L-1$; $m=0, \ldots, M^{(L)}-1$; $M^{(L)}$ is the number of PDCCH candidates to monitor in the given search space defined in FIG. 8; $Y_k$ is equal to $(AY_{k-1}) \bmod D$; $Y_{-1} = n_{RNTI} \neq 0$; $A=39827$; $D=65537$; $k=\lfloor n_s/2 \rfloor$; $n_s$ is the slot number within a radio frame taking value s from 0, 1, . . . , 19; and $n_{RNTI}$ corresponds to one unique RNTI value.

The UE-specific search space for different UEs may or may not overlap. In addition, the UE-specific search space for a given UE may change over subframes and repeat every 10 subframes or 10 ms. Furthermore, the UE-specific search space for different aggregation levels may follow a tree-structure, i.e., the CCEs for aggregation level L may always start with integer multiples of L.

Potential Issues in LTE-A

Regardless of the carrier differentiation approaches (i.e., embedded in PDCCH payload or via PDCCH CRC scrambling), when a component carrier carries PDCCHs scheduling PDSCH and/or PUSCH transmissions for two or more component carriers, the number of UE-specific PDCCHs for a given UE in the component carrier for one link (DL or UL) in any given subframe can be more than one. This is different from Rel-8, where at most one UE-specific PDCCH per link is possible in any subframe. This thus creates some "crowdedness" on a per UE basis. For aggregation levels 1 and 2 there are at most 6 decoding candidates and for aggregation levels 4 and 8 there are at most 2 decoding candidates. Different UEs may have overlapped search spaces, which may effectively further limit the number of decoding candidates per aggregation level. Furthermore, the number of carriers scheduled for a given UE for one link in any given subframe can be up to 5, for example. For two links (DL+UL), the number of carriers scheduled could be 10. If there is only one search space and the same search space as in Rel-8 ({6, 6, 2, 2}) is defined, the offered total number of decoding candidates of 16 in Rel-8 makes it very difficult to support 10 PDCCHs in an efficient way, and if the UE search space overlaps, it may not be possible to support 10 PDCCHs with the provided decoding candidates.

The system may balance the number of UEs across different carriers (i.e., different UEs may have different component carriers carrying PDCCHs). However, such PDCCH load balancing cannot completely alleviate the per-UE "crowdedness" issue.

Figure 9:
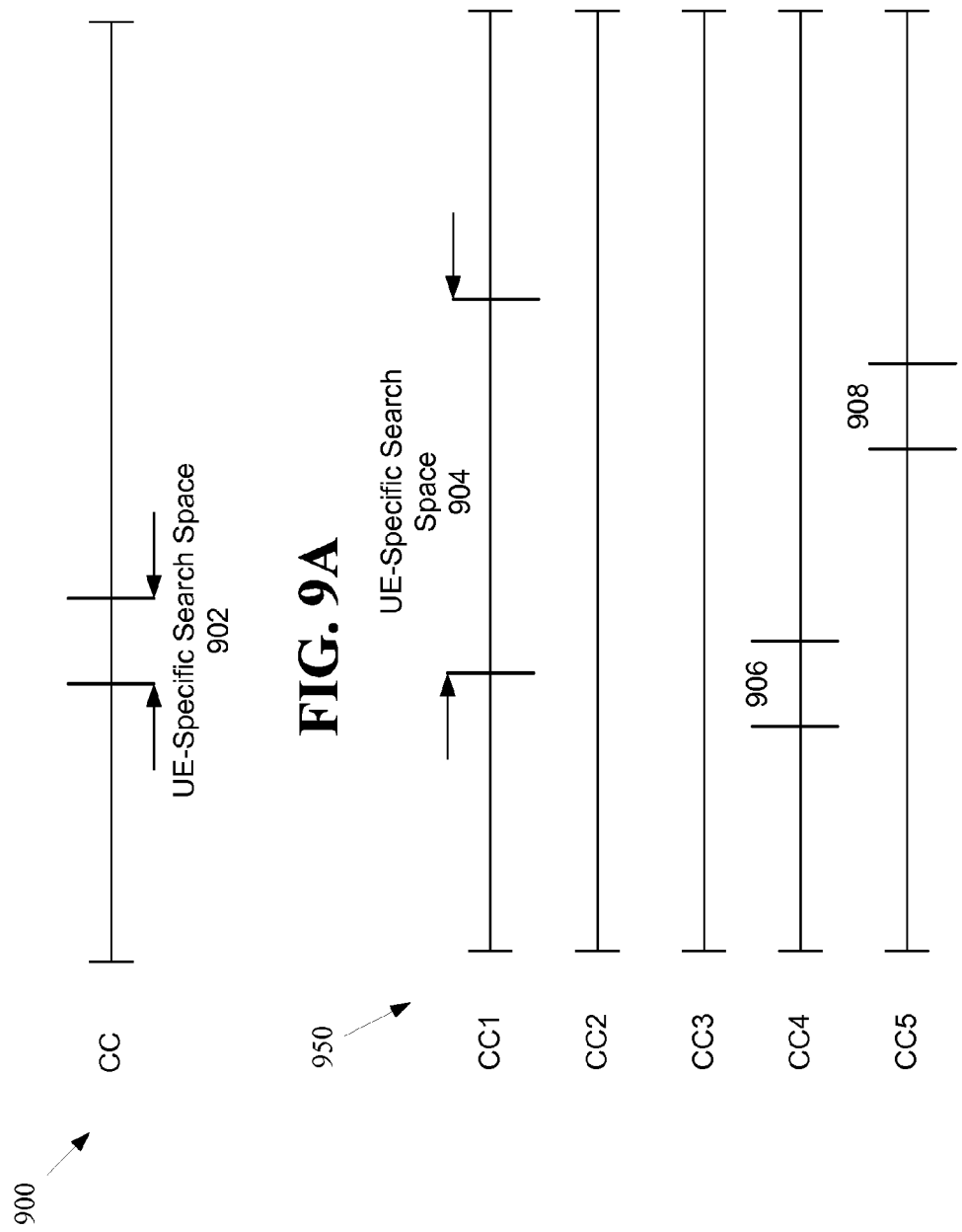
FIG. 9A is a diagram conceptually illustrating a UE-specific search space in the control channel element space for a given subframe for one component carrier in LTE Release 8.
FIG. 9B is a diagram conceptually illustrating an exemplary UE-specific search space in the control channel element space for a given subframe for one component carrier.

FIG. 9A is a diagram 900 conceptually illustrating a UE-specific search space 902 in the CCE space for a given subframe for one component carrier in LTE Rel-8. As discussed earlier, in order to minimize PDCCH blocking probability and to provide reasonable scheduling flexibility, a new search space design is needed.

PDCCH Search Space Design for LTE-A

Figure 10:
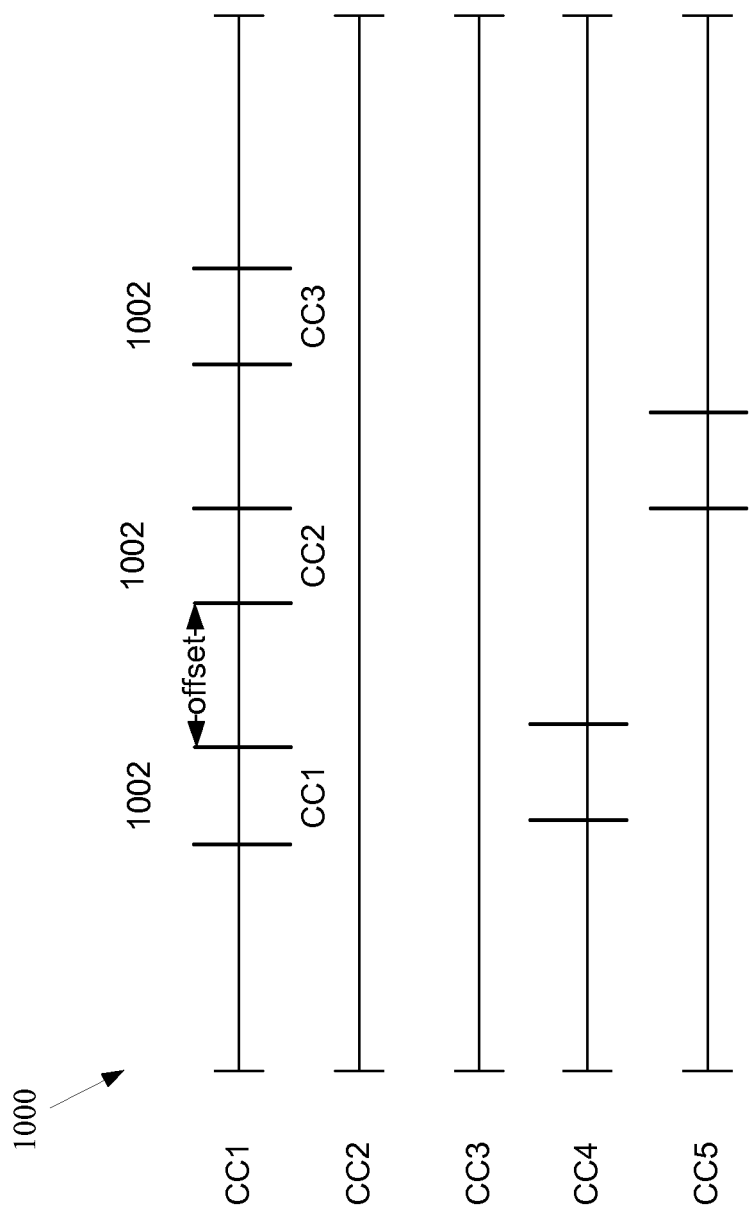
FIG. 10 is a diagram 1000 conceptually illustrating another exemplary UE-specific search space in the control channel element space for a given subframe for one component carrier.

FIG. 9B is a diagram 950 conceptually illustrating an exemplary UE-specific search space 904 in the CCE space for a given subframe for one component carrier. FIG. 10 is a diagram 1000 conceptually illustrating another exemplary UE-specific search space in the CCE space for a given subframe for one component carrier. As shown in FIG. 9B, in order to address the "crowdedness" issue, the number of decoding candidates per UE-specific search space 904 may be increased. For example, if the number of decoding candidates would normally be 6 (such as for aggregation level 1), the number of decoding candidates may be increased to 18 to carry DCI for the component carriers CC1, CC2, and CC3 (assuming CC4 or CC5 have same-carrier control signaling and therefore have their own search spaces 906, 908, respectively). Alternatively or in addition, as shown in FIG. 10, the crowdedness issue may be addressed by defining two or more UE-specific search spaces 1002 for a given UE. As shown in FIG. 10, there are three UE-specific search spaces 1002 with one for each component carrier scheduled through component carrier CC1 (assuming CC1 carries the PDCCH for each of the component carriers CC1, CC2, and CC3). The UE-specific search spaces may be separated by an offset, which may be greater than or equal to zero or less than zero and may be different between each of the search spaces. When the offset is zero, the UE-specific search space appears as shown in FIG. 9B.

Because the number of component carriers per UE is expected to be configured on a per UE basis, the number of decoding candidates and/or search spaces may be specific to a particular UE. Furthermore, if the number of component carriers per UE is semi-statically configured, the number of decoding candidates and/or search spaces may be semi-statically configured as well. However, the number of decoding candidates and/or search spaces may alternatively be static or dynamically configured.

The number of PDCCH candidates and/or the number of UE-specific search spaces may provide a good tradeoff between flexibility in accommodating scheduling of the UE considering the number of component carriers configured and complexity with respect to blind detections (i.e., having a reasonable total number of blind detections resulting from the decoding candidates per search space).

Direct Extension of Search Space and/or Decoding Candidates

FIG. 11A is a diagram 1100 for illustrating an increase in a total number of decoding candidates through an increase in a number of search spaces. FIG. 11B is a diagram 1150 for illustrating an increase in a total number of decoding candidates through an increase in a number of decoding candidates for one search space. As shown in FIG. 11A and FIG. 11B, M is the number of component carriers for which CC1 carries DCI (CC1 carries DCI for component carriers CC1, CC2, . . . , CCM) and K is the number of UE-specific search spaces. Assume that $N_{l,k}(M, K)$ is the number of decoding candidates for aggregation level l (1, 2, 4, or 8) and the k-th UE specific search space, when there are M component carriers and K UE-specific search spaces. While it is possible to have $Na_{l,k1}(M, K) \neq N_{l,k2}(M, K)$, when $k_1 \neq k_2$ (two different UE specific search spaces), for simplicity, it is assumed that $N_{l,k1}(M, K) = N_{l,k2}(M, K) \ \forall \ k_1, k_2$. Furthermore, for convenience, the dependence on M and K is dropped with $N_l$ being generally the number of decoding candidates for aggregation l.

As shown in FIG. 11A, in a first design option, the number of search spaces 1102 may be increased linearly based on the number of carriers M without increasing a number of decoding candidates per search space. As such, K=M and $N_l=\{6, 6, 2, 2\}$ for l={1, 2, 4, 8}. For example, if three component carriers CC1, CC2, and CC3 are scheduled by one component carrier CC1, then there will be three UE-specific search spaces on the component carrier CC1, each of the UE-specific search spaces having 6, 6, 2, and 2 PDCCH decoding candidates for CCE aggregation levels 1, 2, 4, and 8, respectively.

As shown in FIG. 11B, in a second design option, there is only one search space 1154 (K=1), but a maximum of a number of decoding candidates are increased linearly for all aggregation levels: $N_l=\{6M, 6M, 2M, 2M\}$ for l={1, 2, 4, 8}. For example, if there are three component carriers CC1, CC2, and CC3, then there will be one UE-specific search space with 18, 18, 6, and 6 PDCCH decoding candidates for CCE aggregations levels 1, 2, 4, and 8, respectively.

In order to maintain a reasonable total number of blind detections resulting from the decoding candidates per search space, the total number of search spaces and/or decoding candidates may be limited to a specific number. For example, in one design option, the number of search spaces is doubled for M≥2, but the number of decoding candidates per search space remains unchanged. That is, for M≥2, K=2 and $N_l=\{6, 6, 2, 2\}$ for l={1, 2, 4, 8}. For example, if there are three component carriers CC1, CC2, and CC3 scheduled by one component carrier CC1, then there will be two UE-specific search spaces on the component carrier, each of the UE-specific search spaces having 6, 6, 2, and 2 PDCCH decoding candidates for CCE aggregation levels 1, 2, 4, and 8, respectively.

Alternatively, in another design option, for M≥2, the number of decoding candidates for the one search space may be doubled for all aggregation levels. That is, for M≥2, K=1 and $N_l=\{12, 12, 4, 4\}$ for l={1, 2, 4, 8}. For example, if there are three component carriers CC1, CC2, and CC3 scheduled by one component carrier CC1, then there will be one UE-specific search space with 12, 12, 4, and 4 PDCCH decoding candidates for CCE aggregations levels 1, 2, 4, and 8, respectively.

Any combinations of the above design options are possible. As such, both a number of search spaces and a number of decoding candidates per search space may be increased. The first and second options provide for greater flexibility in accommodating scheduling (more total decoding candidates), but have high complexity, as the search spaces and decoding candidates linearly increase with the number of the component carriers. As such, the resulting PDCCH blind detection complexity and false alarm may be a concern. Limiting the increase of search spaces and/or decoding candidates to a specific value (e.g., doubling) provide less flexibility with accommodating scheduling, but effectively limit the increase in complexity.

Other alternatives with respect to limiting the increase in search spaces and/or decoding candidates are possible. For example, the design options may be modified such that the search space/decoding candidates are doubled, tripled, and/or quadrupled for various values of M. For example, the search space decoding candidates may be doubled for M=2 and tripled for M>2. Other options or combinations of the above options are available in order to balance flexibility in accommodating scheduling and complexity due to a number of decoding candidates and search spaces.

For LTE-A cross-carrier PDCCH control signaling, maintaining one search space, but increasing the number of decoding candidates by a predetermined value (e.g., doubling) is less complicated than increasing the number of search spaces by a predetermined value while maintaining the same number of decoding candidates per search space. The former option is less complicated due to only one RNTI being necessary to derive the UE-specific search space rather than two or more RNTIs for the latter option. The PDCCH starting CCE index may be randomly derived based on the UE-specific ID, a number of available CCEs on the carrier with the search space, and/or a CCE aggregation level. The design options are applicable to both the implicit (via CRC masking) and the explicit (via bits embedded in PDCCH payload) indication of the targeted carrier in the cross-carrier PDCCH control signaling.

All aggregation levels may not have the same increase in the number of decoding candidates. For example, instead of {12, 12, 4, 4}, which is a multiple of two of the decoding candidates {6, 6, 2, 2} for aggregation levels 1, 2, 4, and 8, respectively, the decoding candidates {12, 12, 4, 2} might be utilized such that the PDCCH decoding candidates for aggregation level 8 is not increased.

In addition, not all carriers need to have all the PDCCH decoding candidates for each aggregation level. For example, the PDCCH signaling for the primary component carrier may be in a first complete set of {6, 6, 2, 2} candidates, while for a secondary component carrier, the PDCCH signaling may be in another subset of {6, 6, 2, 2} candidates. These subsets across different secondary component carriers may overlap completely or partially.

For the case of two or more search spaces, the determination of the search space may be based on different RNTIs if different RNTIs are configured for different component carriers. Alternatively, the determining of the search space may be based on the primary component carrier RNTI, along with fixed RNTI offsets. In the latter case, the effective RNTI for any secondary component carrier is the primary component carrier RNTI plus an offset, which can be unique for each component carrier, or shared by multiple component carriers. If only one RNTI is configured for all component carriers, the search space can be derived based on the unique RNTI, along with component carrier specific offset(s). The offset(s) can be hard-coded or layer 3 configured, e.g., based on the cross-carrier indication field embedded in PDCCH.

Offset-based PDCCH Search Space Expansion

From the discussions supra, there may be one UE-specific search space over all component carriers and the same number of decoding candidates per component carrier. In light of these properties, another alternative is to have offset-based PDCCH decoding candidates design in LTE-A.

Figure 12:
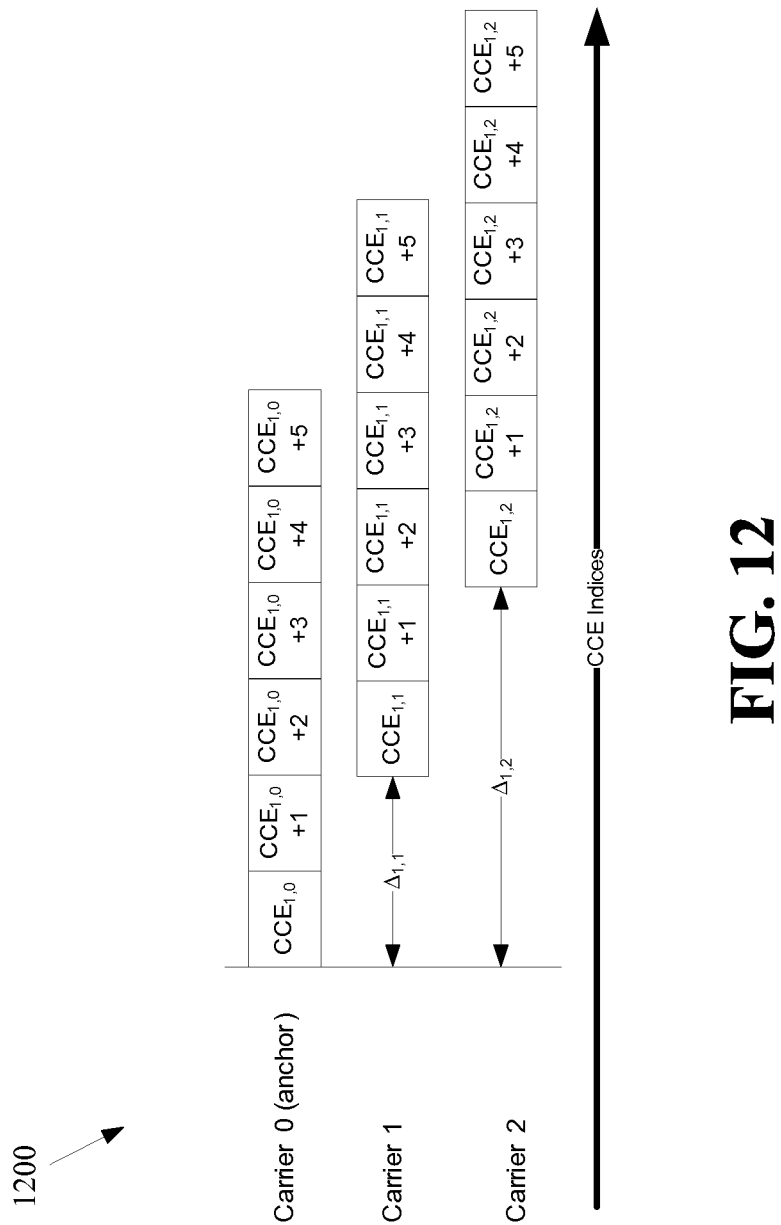
FIG. 12 is a diagram conceptually illustrating an offset-based PDCCH decoding candidate design.

FIG. 12 is a diagram 1200 conceptually illustrating an offset-based PDCCH decoding candidate design. The PDCCH starting CCE index of aggregation level l with one component carrier for a UE in subframe n is denoted as $CCE_{n,l}$, which can be derived as in Rel-8 based on UE RNTI. In addition, M is denoted as the number of component carriers, ordered by {0, 1, . . . , M−1} with 0 being the anchor carrier. The offset $\Delta_{l,m}$ is the offset (in units of CCEs) between the starting CCE index of aggregation level/on the m-th carrier (m=1, 2, . . . , M−1) and the starting CCE index of the anchor carrier. As such, the starting CCE index of the m-th carrier is given by $CCE_{n,l}+\Delta_{l,m}$. The same number of blind decoding candidates for each aggregation level may be kept the same as in Rel-8. The offsets can be chosen such that different component carriers have completely or partially overlapped decoding candidates, or orthogonal decoding candidates. As shown in FIG. 12, the decoding candidates are partially overlapped with l=1, M=3, $\Delta_{1,1}=2$, and $\Delta_{1,2}=4$. While FIG. 12 shows a search space on each of the component carriers, there may be additional component carriers (e.g., Carrier 3 and Carrier 4) without search spaces.

The offsets may be configured on a per UE basis or on a per cell basis. If the offsets are not UE-dependent, the configuration may be on a per cell basis. The tree structure may be maintained as much as possible on the component carrier. If maintained, $\Delta_{l,m}$ for aggregation level 1 is always integer multiples of l for any m. If not maintained, $k_{l,m}=\Delta_m$, independent of the aggregation level, for any m. The offsets across different carriers may be independent or may have some relationship. If independent, each carrier needs its own set of offset(s) defined. If dependent, less number of offsets need to be defined. One dependent example is $\Delta_{l,m}=m\Delta_{l,1}$, m>1 (for the same aggregation level, the offset for the m-th non-anchor carrier is always m times the offset for the first non-anchor carrier). In the special case of per component carrier tree structure, $\Delta_{l,m}=\Delta_m=m\Delta_1$, m>1, for any l. In this case, only one value of $\Delta_1$ needs to be indicated by the eNodeB, and all the other offsets can be implicitly derived.

The extreme case of $\Delta_{l,m}=0$, for any l and m, results in one search space that is shared among multiple component carriers. As such, DCI may be received in that shared search space for any of the component carriers. The offsets can be semi-statically configured via L3 on a per UE basis. Alternatively, they may be static or dynamically configured.

In a first example, $\Delta_{l,m}=K_l*m*l/2$, where $K_l=\{6, 6, 2, 2\}$ for l={1, 2, 4, 8}, respectively, and m is the carrier index of the other component carriers (i.e., other than carrier 0) scheduled by the given component carrier. That is, the offset is half of the size of the total number of CCEs for each aggregation level. As such, for the $m^{th}$ component carrier, the offset $\Delta_{l,m}$ is equal to 3m for l=1, 6m for l=2, 4m for l=4, and 8m for l=8. In a second example, $\Delta_{l,m}=m*l$, where m is the carrier index of other component carriers (i.e., other than carrier 0) scheduled by the given component carrier. That is, the offset is the size of the number of CCEs per decoding candidate for a given aggregation level. As such, for the $m^{th}$ component carrier, the offset $\Delta_{l,m}$ is equal to m for l=1, 2m for l=2, 4m for l=4, and 8m for l=8.

Figure 13:
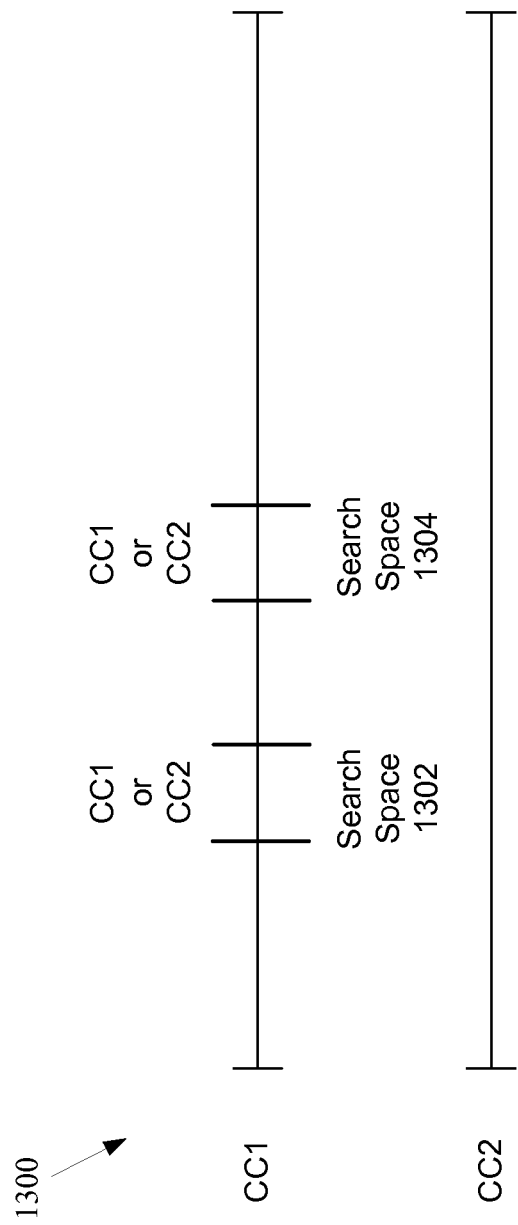
FIG. 13 is a diagram conceptually illustrating that decoding candidates may be shared across component carriers.

FIG. 13 is a diagram 1300 conceptually illustrating that decoding candidates may be shared across component carriers. The UE may monitor all the decoding candidates for each component carrier. For example, as shown in FIG. 13, the search space 1302 and the search space 1304 may be on component carrier CC1 and the search space 1302 may carry DCI for either CC1 or CC2 and the search space 1304 may carry DCI for either CC1 or CC2. As such, the search spaces 1302, 1304 may be shared among two of more component carriers and the UE may monitor all of the decoding candidates (the search spaces 1302, 1304) for each of the component carriers CC1 and CC2. A carrier indicator field (CIF) (which may be three bits) may be used in each search space 1302, 1304 to indicate for which carrier the received DCI is applicable. As such, within one subframe, a search space may carry two DCIs for both component carrier CC1 and component carrier CC2. The UE can determine for which component carrier the received DCI is applicable by determining which of the component carriers is indicated by the CIF in the search space.

Figure 14:
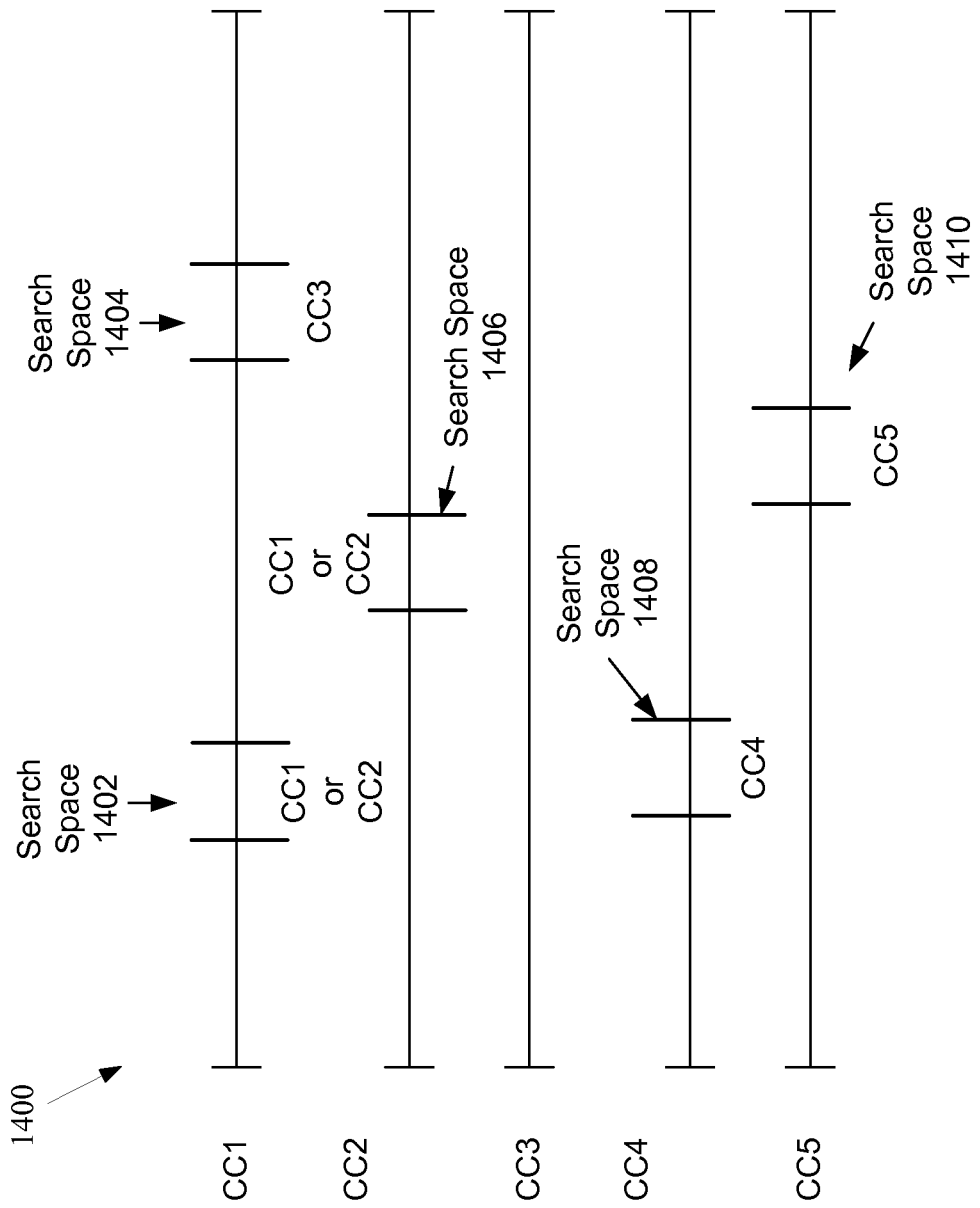
FIG. 14 is another diagram conceptually illustrating sharing of decoding candidates.

FIG. 14 is a diagram 1400 conceptually illustrating sharing of decoding candidates. Generally, some of the search spaces may be shared among two or more component carriers and some of the search spaces may be dedicated for a particular component carrier. For example, as shown in FIG. 14, the search space 1402 on component carrier CC1 may carry DCI for component carrier CC1 or component carrier CC2, the search space 1404 may be dedicated to carry DCI for component carrier CC3, the search space 1406 on component carrier CC2 may carry DCI for component carrier CC1 or component carrier CC2, the search space 1408 on component carrier CC4 may be dedicated to carry DCI for component carrier CC4, and the search space 1410 on component carrier CC5 may be dedicated to carry DCI for component carrier CC5.

Figure 15:
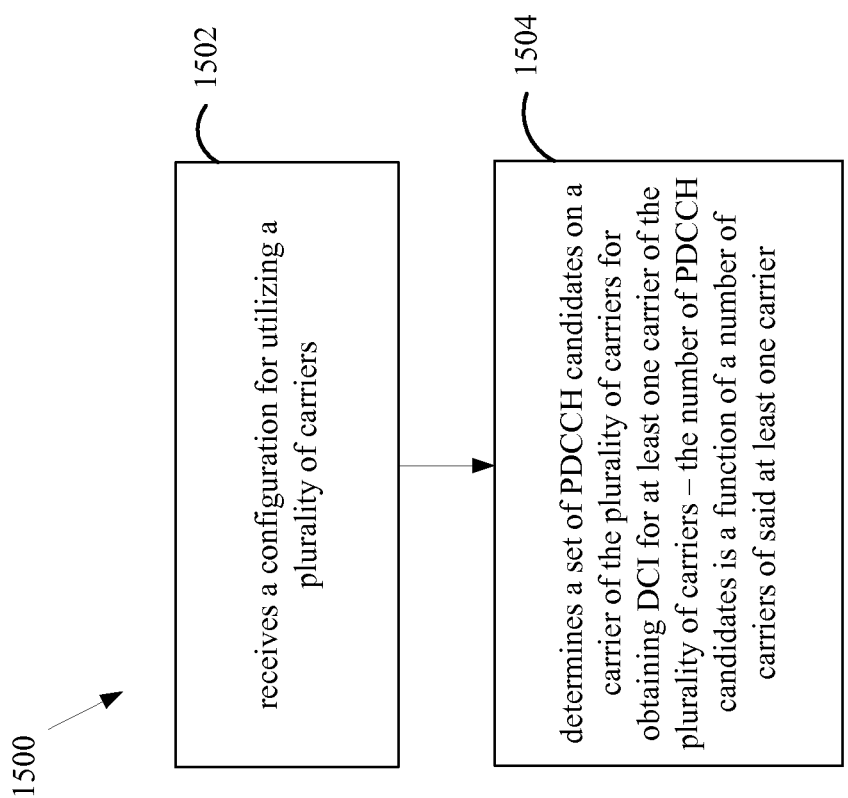
FIG. 15 is a flow chart of a method of wireless communication.

FIG. 15 is a flow chart 1500 of a method of wireless communication with respect to the UE-specific search space for LTE-A cross-carrier control signaling. The method receives a configuration for utilizing a plurality of carriers (1502). In addition, the method determines a set of PDCCH candidates on a carrier of the plurality of carriers for obtaining DCI for at least one carrier of the plurality of carriers (1504). The number of PDCCH candidates is a function of a number of carriers of the at least one carrier (1504). In one configuration, the method searches for the DCI in the carrier. In one configuration, a maximum of the number of the PDCCH candidates increases linearly based on the number of carriers of the at least one carrier. In one configuration, the number of the PDCCH candidates is also function of a CCE aggregation level. In one configuration, to determine the set of PDCCH candidates, the method determines at least one search space for obtaining the DCI. The PDCCH candidates are within the at least one search space. In one configuration, a number of the at least one search space is based on the number of carriers of the at least one carrier. In one configuration, the number of the at least one search space increases linearly based on the number of carriers of the at least one carrier. In one configuration, a starting CCE of the at least one search space on the carrier is randomly derived based on at least one of a UE specific ID, a number of available CCEs on the at least one carrier, or a CCE aggregation level. In one configuration, the at least one search space includes a first search space and the method further determines a second search space on a second carrier for obtaining DCI for one or more of the plurality of carriers. The first search space and the second search space are offset from each other by an offset. In one configuration, each search space for each CCE aggregation level has n CCEs and the search spaces overlap or partially overlap each other such that an absolute value of the offset is less than n. In one configuration, the offset is a multiple of a CCE aggregation level for the search spaces including the PDCCH candidates. In one configuration, the offset is configured through one of statically, semi-statically through radio resource control (RRC) signaling, or dynamically. In one configuration, at least one of the search spaces is shared between at least two carriers and the method further monitors the at least one of the search spaces for DCI applicable to any one of at least two carriers of the plurality of carriers.

Figure 16:
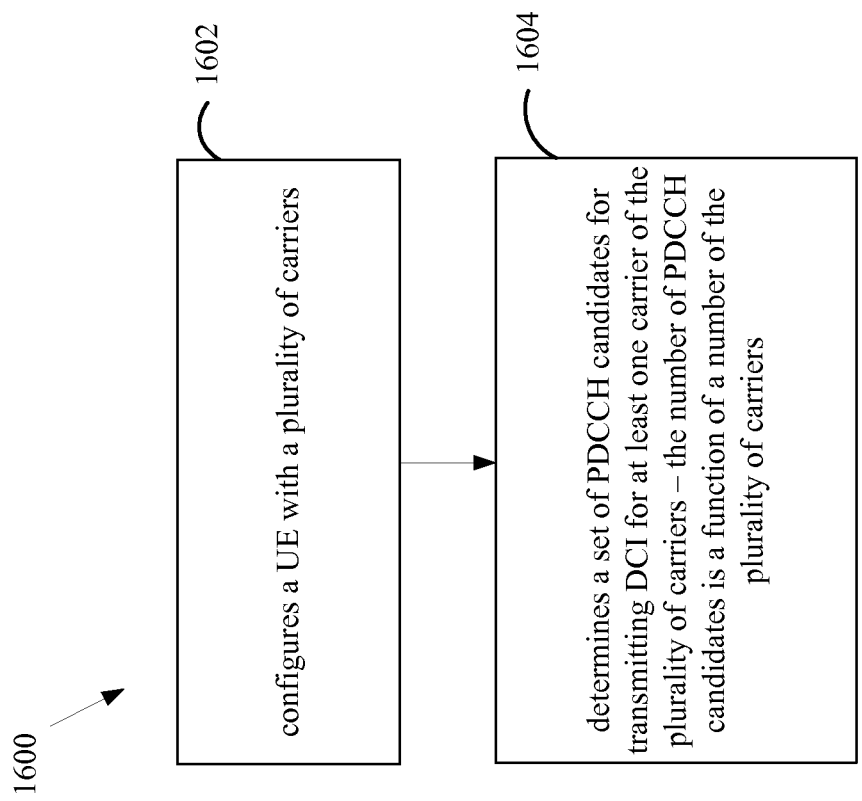
FIG. 16 is another flow chart of a method of wireless communication.

FIG. 16 is a flow chart 1600 of a method of wireless communication with respect to the UE-specific search space for LTE-A cross-carrier control signaling. The method configures a UE with a plurality of carriers (1602). In addition, the method determines a set of PDCCH candidates for transmitting DCI for at least one carrier of the plurality of carriers (1604). The number of PDCCH candidates is a function of a number of the plurality of carriers. In one configuration, the method transmits the DCI in the at least one carrier in order to schedule a PDCCH assignment.

Figure 17:
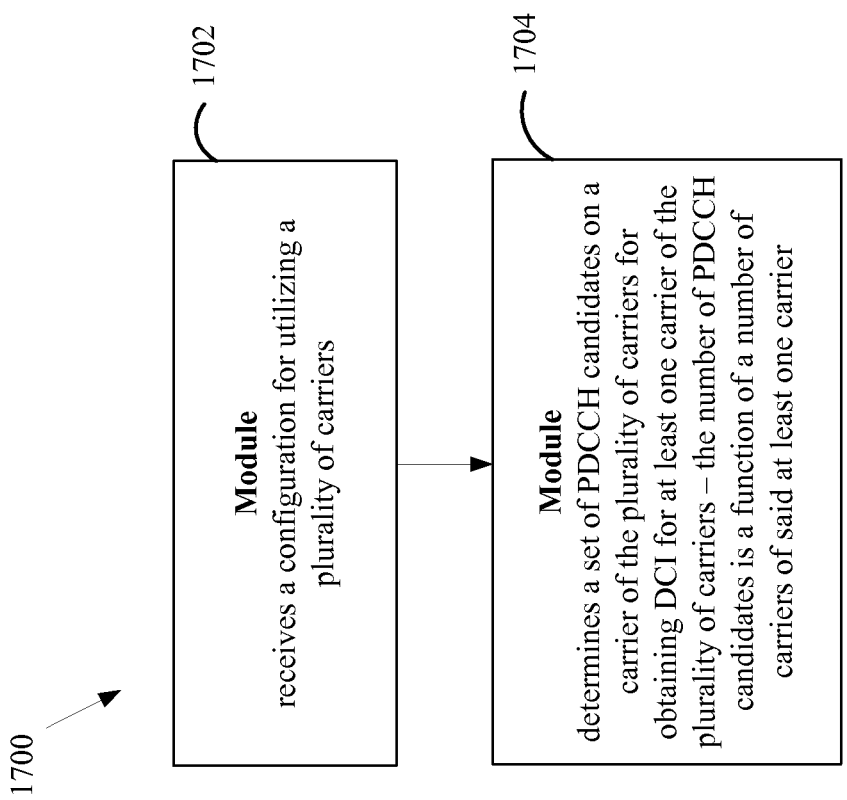
FIG. 17 is a conceptual block diagram illustrating the functionality of an exemplary apparatus.

FIG. 17 is a conceptual block diagram 1700 illustrating the functionality of an exemplary apparatus 100, which may be the UE 650. The apparatus 100 includes a module 1702 that receives a configuration for utilizing a plurality of carriers. In addition, the apparatus 100 includes a module 1704 that determines a set of PDCCH candidates on a carrier of the plurality of carriers for obtaining DCI for at least one carrier of the plurality of carriers. The number of PDCCH candidates is a function of a number of carriers of the at least one carrier.

FIG. 18 is a conceptual block diagram 1800 illustrating the functionality of an exemplary apparatus 100, which may be the eNodeB 610. The apparatus 100 includes a module 1802 that configures a UE with a plurality of carriers. In addition, the apparatus 100 includes a module 1804 that determines a set of PDCCH candidates for transmitting DCI for at least one carrier of the plurality of carriers. The number of PDCCH candidates is a function of a number of the plurality of carriers. In one configuration, the method transmits the DCI in the at least one carrier in order to schedule a PDCCH assignment.

Referring again to FIG. 1 and FIG. 6, in one configuration, the apparatus 100 for wireless communication includes means for configuring a UE with a plurality of carriers and means for determining a set of PDCCH candidates for transmitting DCI for at least one carrier of the plurality of carriers. The number of PDCCH candidates is a function of a number of the plurality of carriers. In one configuration, the apparatus 100 further includes means for searching for the DCI in the carrier. In one configuration, the apparatus 100 further includes means for determining the set of PDCCH candidates determines at least one search space for obtaining the DCI, the PDCCH candidates being within the at least one search space. In one configuration, the apparatus 100 further includes means for determining a second search space on a second carrier for obtaining DCI for one or more of the plurality of carriers. The first search space and the second search space are offset from each other by an offset. In one configuration, the apparatus further includes means for monitoring said at least one of the search spaces for DCI applicable to any one of at least two carriers of the plurality of carriers. The aforementioned means is the processing system 114 configured to perform the functions recited by the aforementioned means. As described supra, the processing system 114 includes the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

In one configuration, the apparatus 100 for wireless communication includes means for receiving a configuration for utilizing a plurality of carriers and means for determining a set of PDCCH candidates on a carrier of the plurality of carriers for obtaining DCI for at least one carrier of the plurality of carriers. The number of PDCCH candidates is a function of a number of carriers of the at least one carrier. The aforementioned means is the processing system 114 configured to perform the functions recited by the aforementioned means. As described supra, the processing system 114 includes the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
receiving, at a user equipment (UE), a configuration for utilizing a plurality of carriers;
determining, by the UE, a set of control channel candidates on a carrier of the plurality of carriers for obtaining downlink control information (DCI) for two or more carriers of the plurality of carriers, a number of the control channel candidates being a function of a number of carriers of the two or more carriers;

wherein the determining the set of control channel candidates comprises determining two or more search spaces, including a first search space for obtaining DCI for a first carrier, the control channel candidates being within the first space, and a second search space for obtaining DCI for a second carrier, wherein the first search space and the second search space are offset from each other by an offset equal to a multiple of an aggregation level for the search spaces including the control channel candidates, and a number of the two or more search spaces is based on the number of the two or more carriers.

2. The method of claim 1, further comprising searching for the DCI in the carrier.

3. The method of claim 1, wherein a maximum of the number of the control channel candidates increases linearly based on the number of carriers of the two or more carriers.

4. The method of claim 1, wherein the number of the control channel candidates is also a function of a control channel element (CCE) aggregation level.

5. The method of claim 1, wherein the number of the two or more search spaces increases linearly based on the number of carriers of the two or more carriers.

6. The method of claim 1, wherein a starting control channel element (CCE) of at least one search space on the carrier is randomly derived based on at least one of a user equipment (UE) specific identification (ID), a number of available CCEs on the carrier, or a CCE aggregation level.

7. The method of claim 1, wherein each search space for each control channel element (CCE) aggregation level has n CCEs and the search spaces overlap or partially overlap each other such that an absolute value of the offset is less than n.

8. The method of claim 1, wherein the offset is configured through one of statically, semi-statically through radio resource control (RRC) signaling, or dynamically.

9. The method of claim 1, wherein at least one of the two or more search spaces is shared between the two or more carriers and wherein the method further comprises monitoring the at least one of the two or more search spaces for DCI applicable to any one of the two or more carriers of the plurality of carriers.

10. A method of wireless communication, comprising:
configuring a user equipment with a plurality of carriers; and
determining a set of control channel candidates for transmitting downlink control information (DCI) for two or more carriers of the plurality of carriers, a number of the control channel candidates being a function of a number of the two or more carriers;
wherein the determining the set of control channel candidates comprises determining two or more search spaces, including a first search space for obtaining DCI for a first carrier, the control channel candidates being within the first space, and a second search space for obtaining DCI for a second carrier, wherein the first search space and the second search space are offset from each other by an offset equal to a multiple of an aggregation level for the search spaces including the control channel candidates, and a number of the two or more search spaces is based on the number of the two or more carriers.

11. The method of claim 10, further comprising transmitting the DCI in at least one carrier of the plurality of carriers in order to schedule a control channel assignment.

12. A user equipment (UE) for wireless communication, comprising:
means for receiving a configuration for utilizing a plurality of carriers;
means for determining a set of control channel candidates on a carrier of the plurality of carriers for obtaining downlink control information (DCI) for two or more carriers of the plurality of carriers, a number of control channel candidates being a function of a number of carriers of the two or more carriers;
wherein the means for determining the set of control channel candidates comprises means for determining two or more search spaces, including a first search space for obtaining DCI for a first carrier, the control channel candidates being within the first space, and a second search space for obtaining DCI for a second carrier, wherein the first search space and the second search space are offset from each other by an offset equal to a multiple of an aggregation level for the search spaces including the control channel candidates, and a number of the two or more search spaces is based on the number of the two or more carriers.

13. The UE of claim 12, further comprising means for searching for the DCI in the carrier.

14. The UE of claim 12, wherein a maximum of the number of the control channel candidates increases linearly based on the number of carriers of the two or more carriers.

15. The UE of claim 12, wherein the number of the control channel candidates is also a function of a control channel element (CCE) aggregation level.

16. The UE of claim 12, wherein the number of the two or more search spaces increases linearly based on the number of carriers of the two or more carriers.

17. The UE of claim 12, wherein a starting control channel element (CCE) of at least one search space on the carrier is randomly derived based on at least one of a user equipment (UE) specific identification (ID), a number of available CCEs on the carrier, or a CCE aggregation level.

18. The UE of claim 12, wherein each search space for each control channel element (CCE) aggregation level has n CCEs and the search spaces overlap or partially overlap each other such that an absolute value of the offset is less than n.

19. The UE of claim 12, wherein the offset is configured through one of statically, semi-statically through radio resource control (RRC) signaling, or dynamically.

20. The UE of claim 12, wherein at least one of the two or more search spaces is shared between the two or more carriers and wherein the apparatus further comprises means for monitoring the at least one of the two or more search spaces for DCI applicable to any one of the two or more carriers of the plurality of carriers.

21. An apparatus for wireless communication, comprising:
means for configuring a user equipment with a plurality of carriers;
means for determining a set of control channel candidates for transmitting downlink control information (DCI) for two or more carriers of the plurality of carriers, a number of the control channel candidates being a function of a number of the two or more carriers;
wherein the means for determining the set of control channel candidates comprises means for determining two or more search spaces, including a first search space for obtaining DCI for a first carrier, the control channel candidates being within the first space, and a second search space for obtaining DCI for a second carrier, wherein the first search space and the second search space are offset from each other by an offset equal to a multiple of an aggregation level for the search spaces including the control channel candidates, and a number of the two or more search spaces is based on the number of the two or more carriers.

22. The apparatus of claim 21, further comprising means for transmitting the DCI in at least one carrier of the plurality of carriers in order to schedule a control channel assignment.

23. A computer program product, comprising:
a non-transitory computer-readable medium comprising code for:
receiving, at a user equipment (UE), a configuration for utilizing a plurality of carriers;
determining, by the UE, a set of control channel candidates on a carrier of the plurality of carriers for obtaining downlink control information (DCI) for two or more carriers of the plurality of carriers, a number of control channel candidates being a function of a number of carriers of the two or more carriers;
wherein the code for determining the set of control channel candidates comprises code for determining two or more search spaces, including a first search space for obtaining DCI for a first carrier, the control channel candidates being within the first space, and a second search space for obtaining DCI for a second carrier, wherein the first search space and the second search space are offset from each other by an offset equal to a multiple of an aggregation level for the search spaces including the control channel candidates, and a number of the two or more search spaces is based on the number of the two or more carriers.

24. The computer program product of claim 23, wherein the non-transitory computer-readable medium further comprises code for searching for the DCI in the carrier.

25. The computer program product of claim 23, wherein a maximum of the number of the control channel candidates increases linearly based on the number of carriers of the two or more carriers.

26. The computer program product of claim 23, wherein the number of the control channel candidates is also a function of a control channel element (CCE) aggregation level.

27. The computer program product of claim 23, wherein the number of the two or more search spaces increases linearly based on the number of carriers of the two or more carriers.

28. The computer program product of claim 23, wherein a starting control channel element (CCE) of the at least one search space on the carrier is randomly derived based on at least one of a user equipment (UE) specific identification (ID), a number of available CCEs on the carrier, or a CCE aggregation level.

29. The computer program product of claim 23, wherein each search space for each control channel element (CCE) aggregation level has n CCEs and the search spaces overlap or partially overlap each other such that an absolute value of the offset is less than n.

30. The computer program product of claim 23, wherein the offset is configured through one of statically, semi-statically through radio resource control (RRC) signaling, or dynamically.

31. The computer program product of claim 23, wherein at least one of the two or more search spaces is shared between the two or more carriers and wherein the non-transitory computer-readable medium further comprises code for monitoring the at least one of the two or more search spaces for DCI applicable to any one of the two or more carriers of the plurality of carriers.

32. A computer program product, comprising:
a non-transitory computer-readable medium comprising code for:
configuring a user equipment with a plurality of carriers;
determining a set of control channel candidates for transmitting downlink control information (DCI) for two or more carriers of the plurality of carriers, a number of the control channel candidates being a function of a number of the two or more carriers;
wherein the code for determining the set of control channel candidates comprises code for determining two or more search spaces, including a first search space for obtaining DCI for a first carrier, the control channel candidates being within the first space, and a second search space for obtaining DCI for a second carrier, wherein the first search space and the second search space are offset from each other by an offset equal to a multiple of an aggregation level for the search spaces including the control channel candidates, and a number of the two or more search spaces is based on the number of the two or more carriers.

33. The computer program product of claim 32, wherein the non-transitory computer-readable medium further comprises code for transmitting the DCI in at least one carrier of the plurality of carriers in order to schedule a control channel assignment.

34. A user equipment (UE) for wireless communication, comprising:
a processing system configured to:
receive a configuration for utilizing a plurality of carriers; and
determine a set of control channel candidates on a carrier of the plurality of carriers for obtaining downlink control information (DCI) for two or more carriers of the plurality of carriers, a number of the control channel candidates being a function of a number of carriers of the two or more carriers;
wherein the processing system is configured to determine the set of control channel candidates at least in part by determining two or more searches spaces, including a first search space for obtaining DCI for a first carrier, the control channel candidates being within the first space, and a second search space for obtaining DCI for a second carrier, wherein the first search space and the second search space are offset from each other by an offset equal to a multiple of an aggregation level for the search spaces including the control channel candidates, and a number of the two or more search spaces is based on the number of the two or more carriers.

35. The UE of claim 34, wherein the processing system is further configured to search for the DCI in the carrier.

36. The UE of claim 34, wherein a maximum of the number of the control channel candidates increases linearly based on the number of carriers of the two or more carriers.

37. The UE of claim 34, wherein the number of the control channel candidates is also a function of a control channel element (CCE) aggregation level.

38. The UE of claim 34, wherein the number of the two or more search spaces increases linearly based on the number of carriers of the two or more carriers.

39. The UE of claim 34, wherein a starting control channel element (CCE) of at least one search space on the carrier is randomly derived based on at least one of a user equipment (UE) specific identification (ID), a number of available CCEs on the carrier, or a CCE aggregation level.

40. The UE of claim 34, wherein each search space for each control channel element (CCE) aggregation level has n CCEs and the search spaces overlap or partially overlap each other such that an absolute value of the offset is less than n.

41. The UE of claim 34, wherein the offset is configured through one of statically, semi-statically through radio resource control (RRC) signaling, or dynamically.

42. The UE of claim 34, wherein at least one of the two or more search spaces is shared between the two or more carriers and wherein the processing system is further configured to monitor the at least one of the two or more search spaces for DCI applicable to any one of the two or more carriers of the plurality of carriers.

43. An apparatus for wireless communication, comprising:
a processing system configured to:
configure a user equipment with a plurality of carriers; and
determine a set of control channel candidates for transmitting downlink control information (DCI) for two or more carriers of the plurality of carriers, a number of the control channel candidates being a function of a number of the two or more carriers;
wherein the processing system is configured to determine the set of control channel candidates at least in part by determining two or more search spaces, including a first search space for obtaining DCI for a first carrier, the control channel candidates being within the first space, and a second search space for obtaining DCI for a second carrier, wherein the first search space and the second search space are offset from each other by an offset equal to a multiple of an aggregation level for the search spaces including the control channel candidates, and a number of the two or more search spaces is based on the number of the two or more carriers.

44. The apparatus of claim 43, wherein the processing system is further configured to transmit the DCI in at least one carrier of the plurality of carriers in order to schedule a control channel assignment.

* * * * *